(12) United States Patent
Bramnik et al.

(10) Patent No.: US 7,959,882 B2
(45) Date of Patent: Jun. 14, 2011

(54) METHOD FOR THE PRODUCTION OF LITHIUM-RICH METAL OXIDES

(75) Inventors: Kirill Bramnik, Mannheim (DE); Hartmut Hibst, Schriesheim (DE); Julian Prölβ, Worms (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 12/595,794

(22) PCT Filed: Apr. 14, 2008

(86) PCT No.: PCT/EP2008/054465
§ 371 (c)(1),
(2), (4) Date: Oct. 13, 2009

(87) PCT Pub. No.: WO2008/125647
PCT Pub. Date: Oct. 23, 2008

(65) Prior Publication Data
US 2010/0044651 A1 Feb. 25, 2010

(30) Foreign Application Priority Data
Apr. 16, 2007 (EP) .................................... 07106255

(51) Int. Cl.
*C01D 15/00* (2006.01)
(52) U.S. Cl. ............. 423/179.5; 423/594.8; 423/594.15; 429/231.9; 429/231.95; 429/231.5; 429/231.2; 252/182.1
(58) Field of Classification Search ................ 423/179.5, 423/594.8, 594.15; 429/231.2, 231.5, 231.9, 429/231.95; 252/182.1
See application file for complete search history.

(56) References Cited

U.S. PATENT DOCUMENTS

| 3,929,504 A | 12/1975 | Gore et al. |
| 3,970,473 A | 7/1976 | Roth et al. |
| 5,013,620 A | 5/1991 | Miyazaki et al. |
| 5,520,903 A | 5/1996 | Chang et al. |
| 5,980,855 A | 11/1999 | Shackle et al. |
| 6,083,475 A | 7/2000 | Shackle et al. |
| 2005/0026041 A1 | 2/2005 | Jouanneau et al. |
| 2006/0263688 A1 | 11/2006 | Guyomard et al. |

FOREIGN PATENT DOCUMENTS

WO WO-2004082047 A2 9/2004

OTHER PUBLICATIONS

S. Jouanneau et al., "New alkaline earth substituted lithium trivanadates; synthesis, characterization and lithium insertion behavior", J. Mater. Chem. 2003, 13, 1827-1834.
J. Kawakita et al., "Structural properties of $Li_{1+x}V_3O_8$ upon lithium insertion at ambient and high temperature", Solid State Ionics 1998, 107, 145-152.
J. Kawakita, et al., "Charging characteristics of $Li_{1+x}V_3O_8$," Solid State Ionics, 1999, vol. 118, pp. 141-147.
G. Pistoia, et al., "Solid solutions $Li_{1+x}V_3O_8$ as cathodes for high rate secondary Li batteries," Solid State Ionics, 1984, vol. 13, pp. 311-318.
A.D. Wadsley, "Crystal chemistry of non-stoichiometric pentavalent vanadium oxides: crystal structure of $Li_{1+x}V_3O_8$," Acta Cryst., 1957, vol. 10, pp. 261-267.

*Primary Examiner* — Harold Y Pyon
*Assistant Examiner* — Haidung D Nguyen
(74) *Attorney, Agent, or Firm* — Connolly Bove Lodge & Hutz LLP

(57) ABSTRACT

A process for preparing lithium-rich metal oxides. The process comprises subjecting a mixture of a metal oxide or a metal oxide with low lithium content and a lithium sulfide in a solid state to a thermal treatment to form a lithium-rich metal oxide and elemental sulfur and subliming off the elemental sulfur. The lithium-rich metal oxides produced from the process may be used as cathode material in lithium ion batteries or electrochemical cells. Suitable metal oxides may be selected from metal oxides of the elements of group Va to VIIa of the Periodic Table and may include vanadium oxides, manganese dioxide, manganese oxide, chromium trioxide, niobium pentoxide, tantalum pentoxide, molybdenum oxides or tungsten trioxide. Metal oxides with low lithium content are metal oxides as defined above which comprise a small amount of lithium, in which the molar ratio of lithium atoms to metal atoms is not more than 1:2.30.

7 Claims, 1 Drawing Sheet

METHOD FOR THE PRODUCTION OF LITHIUM-RICH METAL OXIDES

CROSS-REFERENCE TO RELATED APPLICATIONS

This application is a national stage application (under 35 U.S.C. §371) of PCT/EP2008/054465, filed Apr. 14, 2008, which claims benefit of European application 07106255.8, filed Apr. 16, 2007.

FIELD OF THE INVENTION

The present invention relates to a process for preparing lithium-rich metal oxides and also the lithium-rich metal oxides which can be obtained by this process. Furthermore, the invention relates to the use of lithium-rich metal oxides for producing a cathode for a battery, in particular a lithium ion battery, and also a cathode for a lithium ion battery which comprises lithium-rich metal oxides.

BACKGROUND OF THE INVENTION

In an increasingly mobile society, portable electric appliances are playing an ever greater role. Rechargeable batteries have been used in virtually all aspects of life for many years. In the development of new types of battery systems, there is particular interest in being able to produce batteries which can be recharged in an inexpensive way and combine a high measure of safety in use with a high specific capacity. In addition, their temperature and shock sensitivity and also their spontaneous discharge rate should be low. Furthermore, a very large number of charging and discharge cycles without losses in capacity should be possible (i.e. high cyclability), as a result of which the product life of the battery can be increased.

The anode of a modern high-energy lithium ion battery nowadays typically comprises graphite, but it can also be based on metallic lithium, a lithium alloy or a lithium compound. The use of lithiated metal oxides such as lithium cobalt oxide, lithium nickel oxide, lithium manganese oxide or in particular lithium vanadium oxide has proven itself in recent years for the production of the cathode of a modern lithium ion battery.

In a lithium ion battery, the two electrodes are connected to one another by means of a liquid or solid electrolyte. Possible liquid electrolytes are, in particular, nonaqueous electrolytes and molten salts. As solid electrolytes, it is possible to use, for example, ionically conductive polymers.

When a lithium ion battery having a cathode comprising a lithiated metal oxide is used (discharge), lithium ions migrate into the layer-like structure of the lithiated metal oxide from which they can be removed again during the charging process. When the battery is discharged, lithium is oxidized at the anode to form lithium ions which then migrate through the electrolyte to the cathode. When a lithium ion battery is recharged, reduction of the lithium ions occurs at the anode. Both during discharge and during recharging of the battery, the lithium ions generally migrate through a separator.

For a battery to be able to be used in the long term, not only the anode and the electrolyte but also the cathode have to have a high chemical and electrochemical stability. Since the ability of the lithiated metal oxides having a layer structure to take up and release lithium ions is of great importance for the stability and also the capacity of the cathode, it is an important task to develop lithiated metal oxides which, as a result of their structure, make long-term reversible migration of lithium ions into and out of the electrodes possible.

Since the crystal structure of the lithium vanadium oxides with relatively low lithium content of the formula $Li_{1+x}V_3O_8$ (where x is from 0 to 0.6) was described in detail for the first time about 50 years ago (A. D. Wadsley, Acta Cryst. 1957, vol. 10, p. 261-7), numerous groups of workers worldwide have addressed the use of lithium vanadium oxides for the construction of electrochemical cells. Thus, for example, U.S. Pat. No. 3,929,504 described the structure of a rechargeable battery comprising a lithium anode and an electrolyte material together with a cathode comprising vanadium pentoxide as early as 1975. Later, U.S. Pat. No. 3,970,473 described $Li_{0.33}V_2O_5$ and U.S. Pat. No. 5,013,620 described $Li_{1.1}V_3O_8$ as cathode materials.

Numerous methods of preparing lithium metal oxides with low lithium content are known. For example, a lithium compound can be heated together with vanadium pentoxide to a temperature of about 680° C. to give a fused mass which can subsequently be ground to a powder (S. Pistoia et al., Solid State Ionics 13 (1984), pages 311 to 318).

U.S. Pat. No. 5,520,903 describes a process for preparing lithium vanadium oxides with low lithium content in which a lithium compound such as lithium hydroxide and a vanadium compound such as vanadium pentoxide are mixed, subsequently pressed and then heated to a temperature of at least 570° C.

The US patent application 2005/0026041 describes lithium vanadium oxides which are prepared by pulverizing vanadium oxide and lithium carbonate and subsequently calcining the mixture at 580° C. for 10 hours. This document also describes the construction of a lithium ion battery and the testing of the cathode stability.

Many further processes for preparing lithium metal oxides with low lithium content which comprise the main process steps of mixing of the components, comminution or milling of the intermediate obtained and subsequent calcination are known. However, owing to the high calcination temperatures used, these processes are unsuitable for preparing lithium-rich metal oxides which are frequently thermodynamically unstable.

The preparation of lithium-rich metal oxides is described, for example, in U.S. Pat. No. 5,980,855. The process comprises reacting a metal oxide with lithium metal in an organic solvent in the region of room temperature in the presence of an aromatic hydrocarbon as catalyst.

The preparation of lithium-rich vanadium oxides by reaction of a vanadium oxide with low lithium content with n-butyllithium in n-hexane at room temperature is described by J. Kawakita et al. in Solid State Ionics 118 (1999), pages 141 to 147.

U.S. Pat. No. 6,083,475 discloses the preparation of lithiated metal oxides by reaction of a metal oxide with lithium sulfide in an organic solvent under reflux. The solvent is preferably selected so that it dissolves both the lithium sulfide and the sulfur formed while the metal oxide and also the lithiated metal oxide are not dissolved.

All these processes can be carried out on an industrial scale only with great difficulty or lead to process products which are not suitable for producing high-performance and durable cathodes.

BRIEF SUMMARY OF THE INVENTION

It was therefore an object of the present invention to provide an improved process for preparing lithium-rich metal oxides which is technically simple to carry out and makes it possible to prepare a stable cathode material for lithium ion batteries in relatively large amounts and in a reproducible process. A further object of the present invention was to provide a process whose process product can be processed further without complicated purification and separation steps to produce cathodes.

The object of the invention is achieved by a process for preparing lithium-rich metal oxides, in which an appropriate metal oxide or metal oxide with low lithium content is firstly intimately mixed with lithium sulfide and subsequently subjected to a thermal treatment, with the elemental sulfur which forms being removed in gaseous form from the reaction mixture.

The invention accordingly provides a process for preparing lithium-rich metal oxides, which comprises subjecting a mixture of a metal oxide or a metal oxide with low lithium content and lithium sulfide in the solid state to a thermal treatment and subliming off elemental sulfur.

DETAILED DESCRIPTION OF THE PREFERRED EMBODIMENTS

Figure 1:
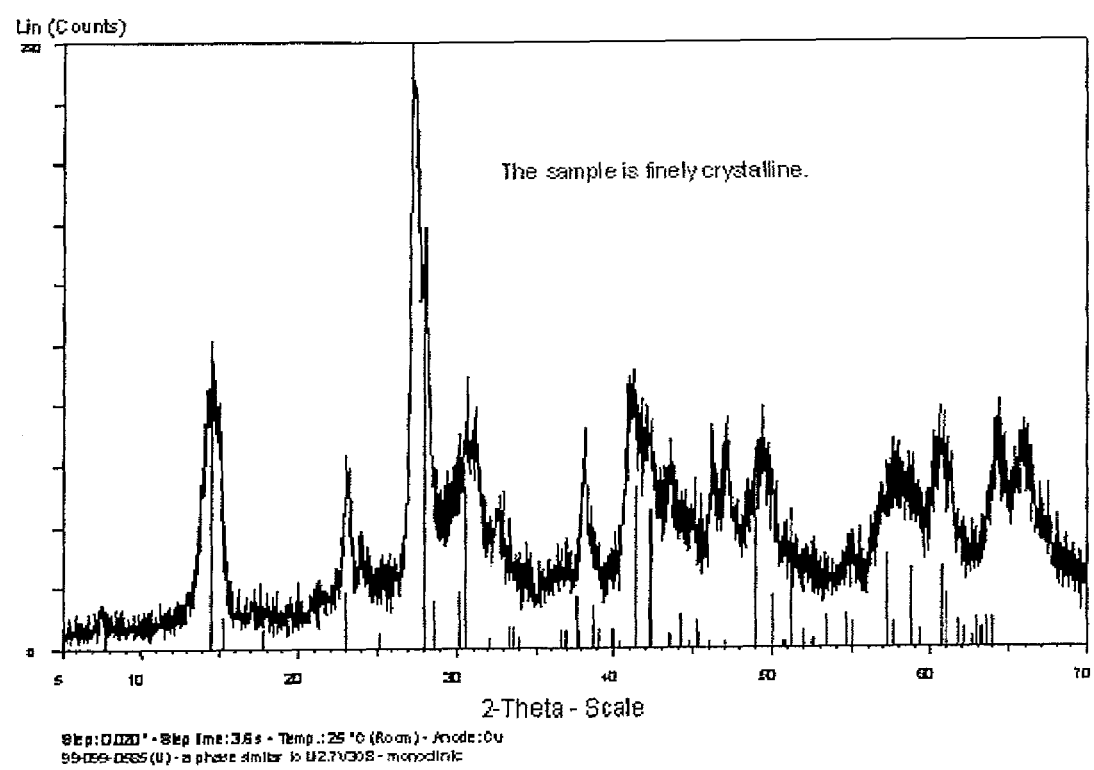
FIG. 1 shows the results of X-ray powder diffraction (XRD) on the product of Example 1. The XRD pattern was measured using Cu-$K_\alpha$ radiation in the 2-theta range from 5 degrees to 64 degrees in steps of 0.02 degrees and an X-ray irradiation time of 3.6 seconds per step on an X-ray instrument "D4-Endeavor" from Bruker.

The metal oxides to be used according to the invention have to be able to form, together with lithium, a compound which can be used as cathode material in lithium ion batteries. Suitable metal oxides are first and foremost transition metal oxides, preferably oxides of the elements of groups Va to VIIa of the Periodic Table. Particularly useful oxides are vanadium oxides such as $V_2O_5$, $V_3O_8$ or $V_6O_{13}$, manganese dioxide, manganese oxide, chromium trioxide, niobium pentoxide, tantalum pentoxide, molybdenum oxides or tungsten trioxide. Very particular preference is given to vanadium oxides.

For the purposes of the present invention, metal oxides with low lithium content are metal oxides as defined above which comprise a small amount of lithium. Metal oxides with low lithium content are compounds, in which the molar ratio of lithium atoms to metal atoms of the metal oxide is not more than 1:2.30, preferably not more than 1:2.70, particularly preferably not more than 1:3.00. Preference is given to lithium vanadium oxides of the general formula $Li_{1+x1}V_3O_8$ (where x1 is from 0 to 0.29)

The term lithium sulfide encompasses any binary lithium-sulfur compound, preferably $Li_2S$.

The mixture of a metal oxide or a metal oxide with low lithium content and lithium sulfide to be used according to the invention is obtained by very intimate mixing of the components by means of customary laboratory methods, for example by joint grinding in a mortar or joint milling in a mill. Since finely divided solids can be mixed more intimately with one another than can coarsely particulate solids, pulverulent starting materials are preferred, particularly preferably starting materials having particle sizes of not more than 500 µm.

The ratio of metal oxide or metal oxide with low lithium content to lithium sulfide in the mixture to be used according to the invention depends on the desired composition of the lithium-rich metal oxide to be prepared. In general, the ratio of the starting materials will be selected so that the molar ratio of lithium atoms to metal atoms of the metal oxide is at least 1:2.29, preferably at least 1:1.00, particularly preferably at least 1.25:1.

In a preferred embodiment of the invention, the lithium-rich metal oxides are lithium vanadium oxides having a composition corresponding to the general formula $Li_{1+x2}V_3O_8$ (where x2 is from 0.3 to 3.9). Preference is given to lithium vanadium oxides which in an X-ray powder diffraction pattern recorded using copper Kα radiation display no distinct line in the two theta range from 27 to 28 degrees. Particular preference is given to lithium vanadium oxides whose X-ray powder diffraction pattern corresponds essentially to that shown in FIG. 1.

In a further preferred embodiment of the invention, a lithium vanadium oxide having a composition corresponding to the general formula $Li_{1+x1}V_3O_8$ (where x1 is from 0.1 to 0.29) which can be prepared, for example, from vanadium pentoxide and lithium carbonate (cf. IT 1148606), is used as metal oxide with low lithium content.

During the thermal treatment of the mixture to be carried out according to the invention, the desired lithium-rich metal oxide and elemental sulfur are formed, and the latter is removed from the reaction mixture by sublimation. The thermal treatment is preferably carried out under conditions (temperature, pressure, time, mixing, gas atmosphere) which are suitable for forming an essentially structurally uniform and sulfur-free lithium-rich metal oxide.

The thermal treatment is carried out at temperatures in the range from 100 to 300° C., preferably in the range from 125 to 275° C., particularly preferably in the range from 150 to 250° C.

The duration of the thermal treatment is generally in the range from 0.5 to 48 hours, preferably from 1 to 20 hours, particularly preferably from 2 to 10 hours. During this time, the temperature can either be kept constant or can be varied within the ranges mentioned in the form of a temperature program.

The thermal treatment can be carried out either under atmospheric pressure or under reduced pressure, with treatment under reduced pressure being preferred in order to aid the sublimation of the sulfur formed. The treatment is particularly preferably carried out at a pressure in the range from 0.01 to 10 mbar.

The thermal treatment is preferably carried out under an inert atmosphere, for example under a nitrogen or argon atmosphere.

During the thermal treatment, the mixture to be used according to the invention is preferably kept in motion, for example in a stirred reactor or a rotary tube oven. The movement allows rapid heat transport and accelerates the sublimation of the sulfur formed. The sulfur generally precipitates as a yellow deposit in the cooler regions of the reactor or oven.

After the thermal treatment, the product is, if appropriate, cooled, for example by means of a stream of inert gas or by cooling at the natural cooling rate of the oven.

If necessary, the product can be washed with a solvent to remove any adhering sulfur or excess lithium sulfide. Such washing is preferably carried out using an organic solvent, for example aliphatic alcohols such as methanol, ethanol or isopropanol or aromatic hydrocarbons such as toluene or benzene.

It has been observed that the temperature of the thermal treatment has a considerable influence on the specific surface area of the lithium-rich metal oxide; at low temperatures, the products formed generally have a larger specific surface area.

The lithium-rich metal oxides which can be obtained by the process of the invention can be mechanically altered, e.g.

milled, comminuted, tableted, compacted or kneaded, before further use. In the steps mentioned, auxiliaries can also be employed. For example, it is possible to use water or organic, solid or liquid compounds to produce a slurry or a shapeable composition.

The present invention also provides lithium-rich metal oxides which can be prepared by the above-described process. These lithium-rich metal oxides preferably have a specific surface area (measured by the BET method described by Brunauer-Emmet-Teller) of from 0.5 to 50 m$^2$/g, particularly preferably from 8 to 30 m$^2$/g, in particular from 10 to 20 m$^2$/g.

The present invention also provides for the use of the lithium-rich metal oxides of the invention for producing a cathode for a battery, in particular a lithium ion battery. The invention further relates to a cathode for a lithium ion battery which comprises a lithium-rich metal oxide according to the invention.

To produce a cathode, the lithium-rich metal oxide is preferably combined with at least one electrically conductive material, as described, for example, in WO 2004/082047.

The invention therefore further provides a cathode for a lithium ion battery, which comprises a lithium-rich metal oxide having a specific surface area of from 0.5 to 50 m$^2$/g and at least one electrically conductive material.

Possible conductive materials are, for example, carbon black, graphite, carbon fibers, carbon nanofibers, carbon nanotubes or electrically conductive polymers. About 2.5-40% by weight of the conductive material is typically used together with the lithium-rich metal oxide in the cathode. To produce the cathode, the lithium-rich metal oxide and the electrically conductive material are, if appropriate with addition of an organic solvent and if appropriate an organic binder (e.g. polyisobutene), mixed with one another by stirring, if appropriate shaped (e.g. spread out) and subsequently dried. A temperature of, for example, from 80 to 150° C. is used here. The drying process can also take place under reduced pressure and generally takes from 3 to 48 hours.

To produce a cathode using the lithium-rich metal oxides of the invention and at least one electrically conductive material, the following polymeric materials, in particular, are possible as binders:

polyethylene oxide (PEO), cellulose, polyethylene, polypropylene, polytetrafluoro-ethylene, polyacrylonitrile-methyl methacrylate, polytetrafluoroethylene, styrene-butadiene copolymers, tetrafluoroethylene-hexafluoroethylene copolymers, polyvinylidene difluoride-hexafluoropropylene copolymers (PVdF-HFP), tetrafluoroethylene-hexafluoropropylene copolymers, tetrafluoroethylene, perfluoroalkyl-vinyl ether copolymers, vinylidene fluoride-hexafluoropropylene copolymers, ethylene-tetrafluoroethylene copolymers, vinylidene fluoride-chlorotrifluoroethylene copolymers, ethylene-chlorofluoroethylene copolymers, ethylene-acrylic acid copolymers (with and without inclusion of sodium ions), ethylene-methacrylic acid copolymers (with and without inclusion of sodium ions), ethylene-methacrylic ester copolymers (with and without inclusion of sodium ions), polyimides and polyisobutene.

The choice of binder is, if appropriate, made taking into account the properties of any solvent used. The binder is generally used in an amount of from 1 to 10% by weight, based on the total mixture of the cathode material. Preference is given to using from 2 to 8% by weight, in particular from 3 to 7% by weight.

The invention also provides for the use of the lithium-rich metal oxides of the invention and at least one electrically conductive material in electrochemical cells. This can, for example, have a prismatic thin film structure in which a solid thin film electrolyte is located between a film which represents an anode and a film which represents a cathode. A central cathodic power lead is arranged between each of the cathode films in order to form a double-sided cell configuration.

In another embodiment, a single-sided cell configuration in which a single cathodic power lead is assigned to a single anode/separator/cathode element combination can be used. In this configuration, an insulating film is typically arranged between individual anode/separator/cathode/power lead element combinations.

The invention is illustrated by the following examples.

EXAMPLE 1 a) Preparation of Li$_{1.1}$V$_3$O$_8$

In a 10 l stirred glass vessel equipped with a heatable double wall, 7.0 l of distilled water were heated to 90° C.. 351.26 g of ammonium metavanadate NH$_4$VO$_3$ (99.9% by weight purity; corresponding to 3 mol from GfE GmbH, 90431 Nuremberg) and 47.47 g of lithium hydroxide LiOH●H$_2$O (having a content of 55.5% by weight of LiOH; corresponding to 1.1 mol, from Chemetall GmbH, 60487 Frankfurt a. M.) were dissolved in succession in the initially charged water at 90° C. while stirring to give a clear, yellow solution. The solution was stirred at a temperature of 90° C. for 15 hours (pH=8.0). The solution was spray-dried in a spray dryer (Mobile Minor™ 2000, MM, manufactured by Niro A/S, 2860 Søborg, Denmark) using air (inlet temperature=330° C., outlet temperature=107° C.).

50 g of the light-brown spray-dried powder obtained were heated to 300° C. under a stream of air (10 standard l/h) in a continually rotating (8 revolutions per minute) fused silica bulb having an internal volume of 1 l and then maintained at this temperature for 1 hour. The product was subsequently cooled to room temperature while continuing the rotation of the fused silica bulb. This gave a dark brown powder whose powder diffraction pattern recorded using Cu-K$_\alpha$ radiation indicated the presence of Li$_{1.1}$V$_3$O$_8$.

b) Preparation of Li$_{3.5}$V$_3$O$_8$ 14.42 g of the Li$_{1.1}$V$_3$O$_8$ prepared under a) and 2.75 g of Li$_2$S (98% pure, Aldrich) were homogeneously mixed in an agate mortar and transferred to a continuously rotating (70 rpm) 250 ml fused silica flask. The flask was evacuated to a pressure of 0.17 mbar and heated to 200° C. in a dynamic vacuum over a period of 20 minutes in a Nabertherm oven. This temperature was maintained for 8 hours. A yellow deposit was formed on the cold parts of the flask projecting from the oven during the reaction. The product was subsequently cooled to room temperature while continuing the rotation of the fused silica bulb.

The black powder obtained was subsequently washed with 250 ml of warm absolute ethanol (in 3 portions) and 250 ml of warm toluene (in 3 portions) on a Schlenk frit under an N$_2$ atmosphere and dried overnight under a stream of N$_2$. The powder diffraction pattern recorded using Cu-K$_\alpha$ radiation indicates the presence of a phase isostructural with Li$_{2.7}$V$_3$O$_8$ (see FIG. 1). The molar ratio of lithium to vanadium in the product is 3.42:3, determined by means of atomic absorption spectrometry (AAS).

The invention claimed is:

1. A process for preparing lithium-rich metal oxides comprising:
    subjecting a mixture of a metal oxide or a metal oxide with low lithium content and lithium sulfide to a thermal treatment in solid state to form a lithium-rich metal oxide; and subliming off elemental sulfur;

wherein the metal oxide with low lithium content is a lithium vanadium oxide having a composition corresponding to the general formula $Li_{1+x1}V_3O_8$, wherein x1 is from 0.1 to 0.29; and wherein the lithium-rich metal oxides have the general formula $Li_{1+x2}V_3O_8$, wherein x2 is from 0.3 to 3.9.

2. The process of claim 1, wherein the metal oxide with low lithium content has a molar ratio of lithium atoms to metal atoms of the metal oxide of not more than 1:2.30.

3. The process of claim 1, wherein the thermal treatment is carried out at temperatures in the range from 100 to 300° C. for a time of from 0.5 to 48 hours.

4. A lithium-rich metal oxide prepared by the process of claim 1, wherein the lithium-rich metal oxide has a specific surface area of from 0.5 to 50 m$^2$/g.

5. A process for using a lithium-rich metal oxide prepared by the process of claim 1 comprising producing a cathode for a lithium ion battery or an electrochemical cell.

6. A cathode for a lithium ion battery comprising:
a lithium-rich metal oxide of claim 4 and at least one electrically conductive material.

7. The cathode for a lithium ion battery of claim 6, wherein the electrically conductive material is any one or more selected from the group consisting of:
carbon black, graphite, carbon fibers, carbon nanofibers, carbon nanotubes or electrically conductive polymers.

* * * * *